INVENTOR.
Frank W. Gutzwiller,
BY Henry J. Marunich
Attorney.

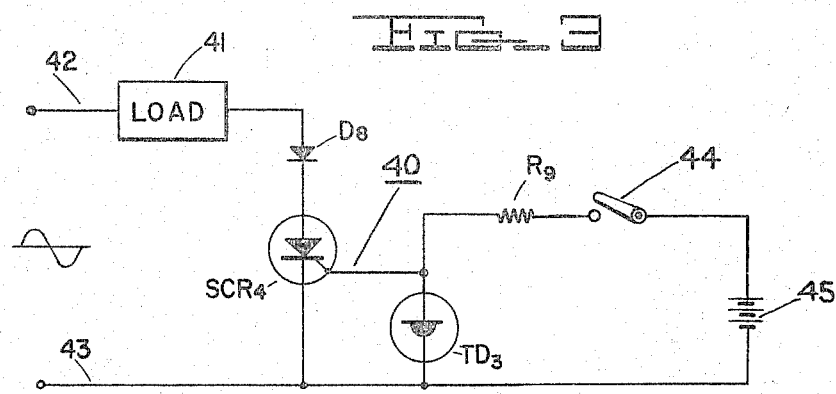
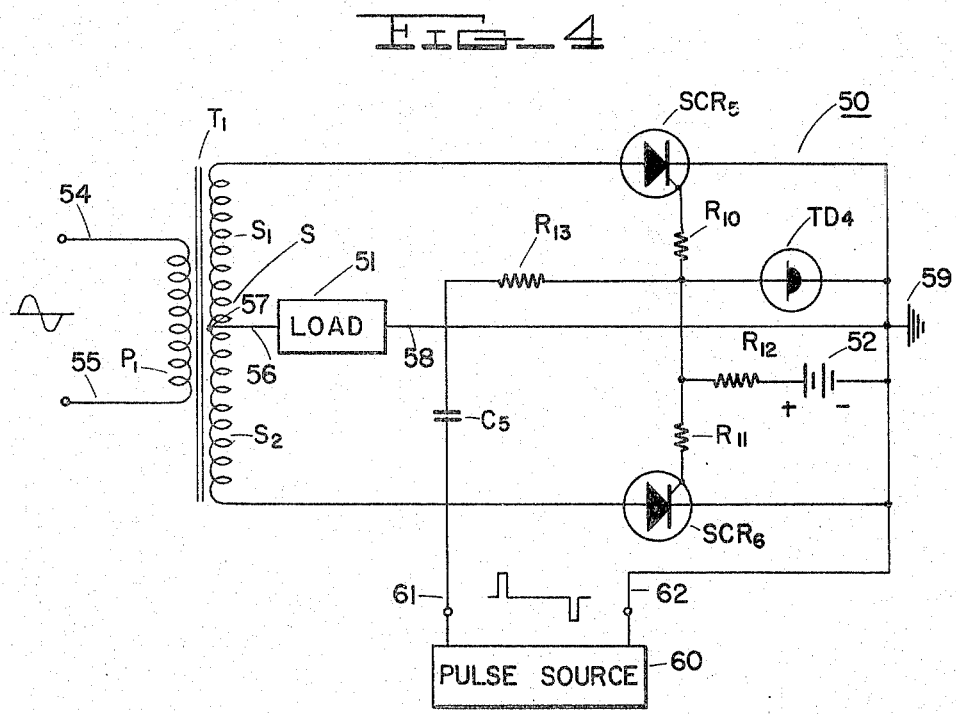

United States Patent Office 3,302,031
Patented Jan. 31, 1967

3,302,031
FULL AND HALF WAVE CONTROL CIRCUITS EMPLOYING TUNNEL DIODE GATE DRIVEN CONTROLLED RECTIFIERS
Frank W. Gutzwiller, Auburn, N.Y., assignor to General Electric Company, a corporation of New York
Filed Sept. 19, 1961, Ser. No. 139,269
9 Claims. (Cl. 307—88.5)

This invention relates to control circuits employing gate driven controlled rectifiers and more particularly to such control circuits which provide for a positive and precise switching of the gate driven controlled rectifier.

A difficulty experience with gate-driven controlled rectifiers, such as silicon controlled rectifiers, in some applications where they are used as switching elements, has been that their gate firing characteristic is relatively unstable. For example, the gate current and voltage required to fire a silicon controlled rectifier varies with the junction temperature and the anode voltage. Thus, variations in temperature and voltage will effect the firing point of the controlled rectifier. In many applications, such as where the controlled rectifiers are employed in a switching network to control the power applied to a load, it may be desirable that the firing point be more precisely controlled. There is a need, therefore, for a control circuit wherein the gate firing characteristics of a gate-driven controlled rectifier can be rendered relatively insensitive to junction temperature and to anode voltage. Further, it is also desirable that such a circuit be readily provided with a latching action so that the controlled rectifier will remain in a conducting state after the gate pulse is removed.

Magnetic firing circuits when used in conjunction with gate driven controlled rectifiers as relay circuits to provide a contactor or latching type of operation have not been entirely satisfactory. The voltage waveform across the load is distorted. Further, the control circuit is sensitive to temperature and voltage variations. It is desirable, therefore, that a control circuit be provided which is relatively insensitive to normal voltage and temperature variations and which will provide a load voltage wave form having a minimum amount of distortion.

Accordingly, it is an object of the invention to provide an improved static control circuit employing gate-driven controlled rectifiers.

It is another object of the invention to provide an improved control circuit which is relatively temperature and supply voltage insensitive.

Another object of the invention is to provide an improved static control circuit which is readily adaptable to contactor and latching type of relay action.

The foregoing and other objects and advantages of the invention are realized by a control circuit which includes at least one gate driven controlled rectifier and a tunnel diode. The tunnel diode is connected across the gate and cathode of the controlled rectifier and has a peak current characteristic such that when the current supplied to the tunnel diode is less than the peak current value, the tunnel diode is in a low impedance state and current supplied to the gate of the controlled rectifier is shunted by the tunnel diode. When the peak current value is exceeded, the tunnel diode switches into a high impedance state and current is diverted to the gate of the controlled rectifier. In this manner the firing point of the controlled rectifier is precisely and positively controlled by the stable peak current of the tunnel diode.

In another aspect of the invention, a holding current supply means is connected in circuit with the tunnel diode. The holding current supplied is less than the peak current of the tunnel diode but is greater than the firing requirements of the controlled rectifier. When the tunnel diode is in a low impedance state, the holding current is shunted through the tunnel diode. However, when the tunnel diode is switched to its high impedance state, holding current is diverted to the gate of the controlled rectifier. The current will continue to be supplied to the gate of the controlled rectifier until the tunnel diode is reset. Accordingly, a latching type of action is provided by the control circuit. A positive pulse will turn the controlled rectifier on and it will remain turned on until a negative pulse is supplied to reset the tunnel diode.

The subject matter which I regard as my invention is set forth in the appended claims. The invention itself, however, together with further objects and advantages thereof may be better understood by referring to the following description taken in conjunction with the accompanying drawings in which:

FIG. 3 illustrates a schematic circuit diagram of another embodiment of the invention wherein a half wave non-latching relay action is provided; and FIG. 4 shows a schematic circuit diagram wherein a pair of silicon controlled rectifiers is used to control the direct current supplied to a load.

Figure 1:
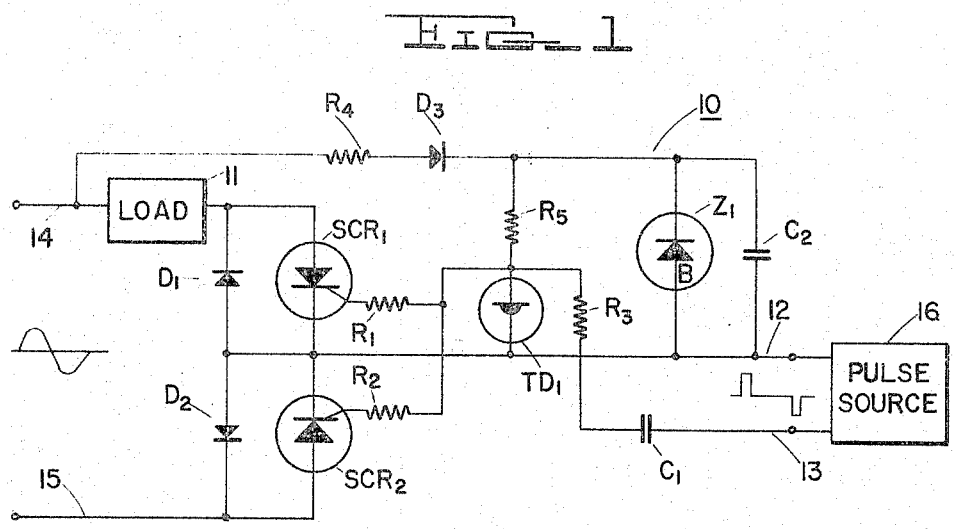
FIG. 1 is a schematic circuit diagram of one embodiment of the invention wherein a full wave latching relay utilizes two controlled rectifiers.

As shown in FIG. 1 of the drawings a static control circuit generally identified by reference numeral 10 employs a pair of controlled rectifiers $SCR_1$ and $SCR_2$ to switch the alternating current supplied to a load 11. The control circuit 10 functions as an electronic switch and is analogous in operation to an electromechanical latching relay.

A pair of input terminal leads 14, 15 are provided for connection to a suitable alternating current supply, such as a 117 volt A.C., 60 cycle supply. The signal input leads 12, 13 are connected in circuit with a pulse source 16, which provides positive and negative voltage pulses, a positive pulse on lead 13 being sufficient in magnitude to switch the tunnel diode $TD_1$ to a high impedance state and the negative pulse being sufficient in magnitude to reset the tunnel diode $TD_1$ to its low impedance state.

A holding current supply mans which can be energized from the A.C. supply and which includes a diode $D_3$ and zener diode $Z_1$, serves in conjunction with tunnel diode $TD_1$ to provide a latching action for the silicon controlled rectifiers $SCR_1$, $SCR_2$. When a positive signal pulse is applied on lead 13 with respect to lead 12, the tunnel diode $TD_1$ is switched to a high impedance state provided the amplitude of the signal pulse is higher than the peak current of the tunnel diode $TD_1$ and a current pulse is supplied to the gates of controlled rectifiers $SCR_1$, $SCR_2$. Tunnel diode $TD_1$ is maintained in its high impedance state after the pulse is removed by the holding current supply. When a negative signal pulse is applied across the signal input leads 13, 12, tunnel diode $TD_1$ is reset to its low impedance state and the silicon controlled rectifiers $SCR_1$ and $SCR_2$ lose their gate drive and turn off when they are subjected to inverse voltage in their respective parts of the cycle. Diodes $D_1$ and $D_2$ are so poled so that they provide a by-pass path so that the load current is shunted around the controlled rectifiers $SCR_1$ or $SCR_2$ while they are reverse biased. Resistors $R_1$ and $R_2$ connected in circuit with the gates of controlled rectifiers $SCR_1$, $SCR_2$ are provided to equalize the gate current to both controlled rectifiers $SCR_1$, $SCR_2$. A resistor $R_3$ and a capacitor $C_1$ connected in circuit with signal input lead 13 provide a means for coupling the signal pulse to the tunnel diode $TD_1$.

In the circuit shown in FIG. 1, I have provided a means for supplying the holding current requirements of the controlled rectifiers $SCR_1$ and $SCR_2$ that includes a current limiting resistor $R_4$, a half wave rectifier or diode, $D_3$, resistor $R_5$, a capacitor $C_2$ and zener diode $Z_1$. The zener diode $Z_1$ was employed since it exhibits a high resistance to current flow below a predetermined breakdown voltage and thereafter breaks down in the reverse direction to exhibit substantially zero resistance to additional current flow, thus providing essentially constant voltage for the holding current supply. The capacitor $C_2$ serves to filter the output of the half wave rectifier $D_3$. It will be understood that, although in FIG. 1 we have have illustrated a circuit which provides the holding current for the controlled rectifiers $SCR_1$, $SCR_2$ and is energized from the alternating current supply. a separate source of direct current such as a battery may be used if desired.

The tunnel diodes $TD_1$, $TD_2$, $TD_3$, and $TD_4$ used in the illustrative embodiments of the invention shown in FIGS. 1 through 4 are two terminal semiconductor devices employing a single PN junction. The P layer is referred to herein as the anode and is shown schematically by the horizontal line while the N-layer is referred to herein as the cathode and is shown schematically as an arcuate portion joined to the anode. When a forward voltage less than the peak voltage is applied, the tunnel diode exhibits a low resistance and may be considered in its low impedance state.

For a range of intermediate values of the forward voltage, the tunnel diode is characterized by a negative conductance. Above the valley point voltage, the tunnel diode has a characteristic that is similar to the forward characteristic of a conventional diode and may be considered to be in a high impedance state. The characteristics of tunnel diodes which may be used in the practice of the invention are more fully described at pages 143–153 of the General Electric Transistor Manual, 5th edition, 1960. Although tunnel diodes employing other materials may be used provided their characteristics appropriately match the firing characteristics of the controlled rectifiers, gallium arsenide tunnel diodes were used in the exemplifications of the invention. Further, it will be understood that more than one tunnel diode may be connected in a series string arrangement to provide the proper peak valley characteristics required in a particular application.

By connecting a tunnel diode $TD_3$ as shown in FIG. 3, the controlled rectifier $SCR_4$ will not be fired until the peak current of the tunnel diode is exceeded. It was founded that it was thereby possible to achieve a very stable and precise gate firing characteristic with such an arrangement. For example, where a gallium arsenide diode having a peak current of 103 milliamperes was employed, the silicon controlled rectifier $SCR_4$ could be turned on with a gate current of 103 milliamperes, plus or minus one, over a temperature range from 25 degrees to 150 degrees centigrade.

The switching arrangement in the control circuit shown in FIG. 1 includes a pair of silicon controlled rectifiers $SCR_1$, and $SCR_2$ which have their cathodes connected to a common junction, and a pair of diodes $D_1$, $D_2$ connected in inverse relationship across the controlled rectifiers $SCR_1$, $SCR_2$. It will be appreciated that the control circuit arrangement of the present invention can also be utilized in an arrangement wherein the controlled rectifiers are connected back-to-back with minor modifications.

Controlled rectifiers used in the exemplifications of the invention were PNPN semiconductors, each having an anode represented by the triangular symbol, a cathode represented by the horizontal line drawn through the apex of the triangle, and a gate electrode represented by the diagonal line extending from the cathode. Preferably, silicon controlled rectifiers are employed since they are readily adaptable to use as switching elements. The operating characteristics of a silicon controlled rectifier are such that it conducts in a forward direction with a forward characteristic very similar to that of an ordinary rectifier when a gate signal is applied. The silicon controlled rectifier will continue to conduct even after the gate signal is removed when sufficient holding current is supplied to the anode.

The control circuit shown in FIG. 1 and employing the following circuit components was operated satisfactorily to control approximately 10 amperes from a 117 volt, 60 cycle source:

Controlled rectifiers
  $SCR_1$, $SCR_2$ _____ General Electric C10 silicon controlled rectifiers.
Diodes $D_1$, $D_2$ _____ General Electric 1N1344A silicon rectifiers.
Diode $D_3$ _____ General Electric 1N1695 silicon rectifier.
Resistors $R_1$, $R_2$ _____ 20 ohms.
Resistor $R_3$ _____ 25 ohms.
Resistor $R_4$ _____ 500 ohms, 10 watt.
Resistor $R_5$ _____ 250 ohms, 2 watt.
Tunnel diode $TD_1$ _____ Experimental gallium arsenide tunnel diode (peak current = 103 ma.).
Zener diode $Z_1$ _____ 16 volt, 1 watt Zener diode.
Capacitor $C_1$ _____ 2 microfarads.
Capacitor $C_2$ _____ 100 microfarads.

It will be appreciated that the foregoing components and circuits constants are given by way of an illustrative example of the invention, and it is not intended to limit the invention thereto. One advantage of the foregoing control circuit, as compared with circuits of the prior art employing magnetic triggering of controlled rectifiers, was that the voltage waveform across the load was substantially free of distortion. The only detectable distortion in the load voltage waveform was a step of approximately 40 microseconds duration at the point where the voltage waveform passed through zero.

Having reference again to the control circuit 10 shown in FIG. 1, the operation of the control circuit 10 will now be more fully described. The operation is, of course, initiated by connecting the input terminal leads 14, 15 in circuit with a suitable alternating current source and by connecting the signal input leads 12, 13 with the pulse source 16. When the input terminal leads 14, 15 are energized, it will be seen that the current is supplied to the half wave rectifier $D_3$ and the zener diode $Z_1$. A holding current, which is less than peak current of tunnel diode $TD_1$ but greater than the firing requirements of the silicon controlled rectifiers $SCR_1$ and $SCR_2$, is supplied to the tunnel diode $TD_1$. Since the holding current is less than the peak current of the tunnel diode $TD_1$ and since the tunnel diode $TD_1$ is in its low impedance state, the holding current is shunted through the tunnel diode $TD_1$. When the first positive voltage pulse is applied between input leads 13 and 12, tunnel diode $TD_1$ is switched to its high impedance state and the holding current is diverted to the gates of the controlled rectifiers $SCR_1$, $SCR_2$, firing the forward biased controlled rectifier.

Taking an arbitrary half cycle of the alternating current supply during which silicon controlled rectifier $SCR_1$ is forward biased, it will be seen that a positive pulse across signal input leads 13, 12 will trigger controlled rectifier $SCR_1$ into a conducting state. The path of current flow may be traced from the input terminal lead 14 through the load 11, silicon controlled rectifier $SCR_1$, diode $D_2$, and to input terminal lead 15. Tunnel diode $TD_1$ remains in its high impedance state as long as current continues to flow through it from the holding supply, thus, in the next half cycle when the voltage at the anode of controlled rectifier $SCR_2$ is positive, controlled rectifier $SCR_2$ will also be triggered into a conducting state and the path of current flow will be reversed. Thus, during the next half cycle, the current follows a path starting with input terminal lead 15 through silicon controlled rectifier $SCR_2$, diode $D_1$, load 11, and to input terminal lead 14.

When a negative voltage pulse is applied across signal input leads 12, 13, current through tunnel diode $TD_1$ will be momentarily reversed and it will be switched to its low impedance state. The conducting controlled rectifiers, $SCR_1$ and $SCR_2$, will loose their gate drive, and will cease to conduct on the following half cycle. Thus, it will be seen that the circuit is analogous in its operation to an electromechanical latching relay. When a positive signal is applied to the signal input leads 13, 12, the latching relay is closed and when a negative voltage is applied, the latching relay is opened. In the exemplification of the invention, a signal pulse of 6 volts was found to be sufficient to switch the tunnel diode $TD_1$ to its high impedance state and to return the tunnel diode $TD_1$ to its low impedance state.

Figure 2:
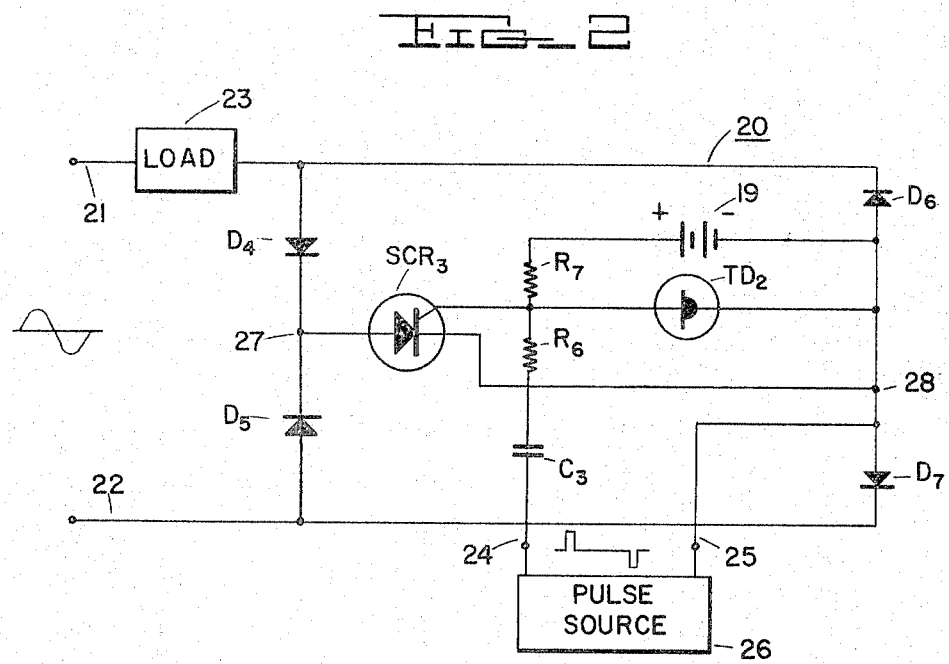
FIG. 2 shows a schematic circuit diagram of another embodiment of the invention wherein a silicon controlled rectifier is connected inside of a single phase bridge so that a single controlled rectifier exercises control over each half cycle of the alternating current supply.

Turning now to the control circuit 20 shown in FIG. 2, it will be seen that I have illustrated therein a modification wherein a single silicon controlled rectifier $SCR_3$ is connected inside of a single phase bridge comprising diodes $D_4$, $D_5$, $D_6$, $D_7$ and can be utilized to exercise control over both halves of the alternating current supply. Also, in contradistinction to the control circuit 10 shown in FIG. 1, it will be noted that in control circuit 20, shown in FIG. 2, a separate source of direct current including a battery 19 and a current limiting resistor $R_7$, are provided to supply a holding current. The battery 19 supplies a current which is less in magnitude than the peak current of tunnel diode $TD_2$ but greater than the firing requirements of the silicon controlled rectifier $SCR_3$.

The control circuit 20 is energized by connecting a pair of input terminal leads 21, 22 across a suitable alternating current supply. A load 23 shown schematically by the block diagram is connected in circuit with input terminal lead 21. A pair of signal input leads 24, 25 are connected to a pulse source that provides alternating pulses having sufficient amplitude to reset the tunnel diode $TD_2$ to a low impedance state and to switch it to its high impedance state to cause controlled rectifier $SCR_3$ to be fired. A resistor $R_6$ limits the current to a value where it will switch the tunnel diode $TD_2$ to a high impedance state but insufficient in amount to fire the silicon controlled rectifier $SCR_3$, and capacitor $C_3$ is used as a suitable coupling device.

As shown in FIG. 2, the cathodes of the diodes $D_4$, $D_5$ are connected to a common junction 27 which is connected in circuit with the anode of controlled rectifier $SCR_3$ while the anodes of diodes $D_6$, $D_7$ are connected to a common junction 28 joined to the cathode of silicon controlled rectifier $SCR_3$. In such a circuit arrangement it will be seen that a single silicon controlled rectifier $SCR_3$ can exercise control of each half cycle of the alternating current applied across input terminal leads 21, 22.

The control circuit 20 shown in FIG. 2 is energized by connecting the terminal leads 21, 22 in circuit with a suitable alternating current supply and by connecting the signal input leads 24, 25 in circuit with a pulse source 26. Because of the rectifying action of the diodes $D_4$, $D_5$, $D_6$ and $D_7$, silicon controlled rectifier $SCR_3$ is subjected to a single phase full wave rectified A.C. voltage. Since there are three forward biased diode drops in series across the line when controlled rectifier $SCR_3$ is conducting, the current flow is limited to a sufficiently small value for a time interval in each half cycle that allows the gate of controlled rectifier $SCR_3$ to regain control of its anode blocking characteristics.

Assuming that a positive pulse of voltage is applied across signal input leads 24, 25 in an arbitrary half cycle of the alternating current supply, tunnel diode $TD_2$ is switched to its high impedance state and the holding current supplied by the battery 19 is diverted to the gate of silicon controlled rectifier $SCR_3$ thereby turning it on. Further, assuming that in this half cycle the voltage at input terminal lead 21 is of positive polarity, the path of current flow may be traced from input terminal lead 21 through the load 23, diode $D_4$, junction 27, silicon controlled rectifier $SCR_3$, junction 28, diode $D_7$ and to input terminal lead 22. Tunnel diode $TD_2$ remains in its high impedance state, and controlled rectifier $SCR_3$ conducts on all subsequent half cycles until such time as a negative pulse is applied to terminal 24. The path of load current flow during alternate half cycles in the "on" state may be traced from input terminal lead 22 through diode $D_5$, junction 27, silicon controlled rectifier $SCR_3$, junction 28, diode $D_6$, the load 23 and to input terminal lead 21.

When a negative voltage pulse appears across the signal input leads 24, 25, tunnel diode $TD_2$ is reset to its low impedance state and holding current is shunted through tunnel diode $TD_2$ thereby preventing controlled rectifier $SCR_3$ from turning on during the following half cycle. From the foregoing description of the control circuit 20, it will be seen that the invention is readily adaptable to a full wave latching relay circuit employing a single controlled rectifier.

In FIG. 3 I have illustrated another embodiment of the invention wherein a control circuit 40 incorporating a half wave non-latching relay action is provided. In this modification of the invention a diode $D_8$ and a silicon controlled rectifier $SCR_4$ are connected in series circuit relation with a load 41 across a pair of input terminal leads 42, 43 which are adapted for connection to a suitable alternating current supply. Although the circuit 40 is shown for a load 41 energized from an alternating current supply, as will be hereinafter more fully explained, it may be used in conjunction with loads energized from a D.C. supply. A resistor $R_9$ and switch 44 are connected in circuit with direct current source. The signal current is supplied by the direct current source, such as a battery 45, through the resistor $R_9$ which limits the peak current supplied to the gate of controlled rectifier $SCR_4$ and which maintains the current below the peak current of tunnel diode $TD_3$.

The tunnel diode $TD_3$ used had peak and valley characteristics such that the controlled rectifier $SCR_3$ would not fire untitl the peak current of the tunnel diode $TD_3$ was exceeded. The diode $D_8$ connected in series circuit relationship with silicon controlled rectifier $SCR_4$ may be used if it is required to limit the reverse leakage current through the controlled rectifier $SCR_4$ that results from subjecting it to a gate drive while an inverse voltage is applied across it.

In operation, the control circuit shown in FIG. 3 will act as a half wave contactor by opening and closing switch 44. The silicon controlled rectifier $SCR_4$ will conduct when the voltage at its anode is positive with respect to the cathode after a positive voltage pulse has been applied across tunnel diode $TD_3$. This pulse causes tunnel diode $TD_3$ to switch to its high impedance state and divert current into the gate of the silicon controlled rectifier $SCR_4$. For this condition the path of current flow is from input terminal lead 42 through the load 41, diode $D_8$, silicon controlled rectifier $SCR_4$ and to input terminal lead 43.

It will be understood that when a pulse source is used, as is the case in the illustrative embodiments of the invention shown in FIGS. 1, 2 and 4, a holding current supply keeps the tunnel diode latched in and thereby keeps the controlled rectifiers in a latching mode. Thus, where a pulse signal source is employed, the stability of the firing characteristic of the controlled rectifier is of secondary importance. However, stable firing points are desirable in the circuit shown in FIG. 3 since a D.C. type of signal source is used which progressively increases to the firing point as the D.C. supply is cut in the circuit. Unless some provision is made for precisely controlling the firing point, the firing point would vary with temperature, anode voltage and the gate characteristics of the particular controlled rectifier used. In the non-latching type of circuit shown in FIG. 3, the tunnel diode $TD_3$ provides an excellent reference for the gate signal which makes it possible to fire the controlled rectifier $SCR_4$ at a precisely controlled firing point irrespective of anode voltage, temperature and normal variations in the gate characteristics of a silicon controlled rectifier.

Although only a half wave version of a control circuit is illustrated in FIG. 3, it will be appreciated the invention is readily adaptable to a full wave circuit. Further, it was found that where the circuit 40 shown in FIG. 3 is used with a D.C. voltage supply on the load 41, a latching type of circuit results. This is due to the fact that the silicon controlled rectifier continues to conduct once it is fired until the main anode supply is interrupted or reversed.

In FIG. 4 I have illustrated a full wave center tapped rectifier supply wherein a control circuit 50 embodying the invention is used to control the D.C. current supplied to a load 15. In accordance with the invention a tunnel diode $TD_4$ is connected across the gates and cathodes of controlled rectifiers $SCR_5$, $SCR_6$ and a battery 52 supplies a holding current that is less than the peak current of tunnel diode $TD_4$. Full wave rectification is accomplished by employing a transformer $T_1$ having a center tapped secondary S and a pair of controlled rectifiers $SCR_5$ and $SCR_6$ connected in circuit with the ends of the secondary winding S.

The secondary winding S is divided into two secondary winding portions $S_1$ and $S_2$, which may, if preferred, be separate windings or a center tapped winding as shown in FIG. 4. The secondary winding S is inductively coupled on a magnetic core 53 with primary winding $P_1$. A pair of input terminal leads 54, 55 are connected in circuit with primary winding $P_1$ and are provided for connection to a suitable alternating current supply. It will be seen that load 51 is connected at one end to an output lead 56 joining center tap 57 of the secondary winding S. The other end of the load 51 is connected to output lead 58 which is joined in electrical circuit with the cathodes of controlled rectifiers $SCR_5$, $SCR_6$ and with ground 59.

Controlled rectifiers $SCR_5$, $SCR_6$ are controlled by positive and negative voltage pulses supplied by a pulse source 60 to tunnel diode $TD_4$. The pulse source 60 is connected in circuit with signal input leads 61, 62. A capacitor $C_5$ and resistor $R_{13}$ are connected in circuit with signal input terminal lead 61 for coupling purposes. The resistors $R_{10}$ and $R_{11}$ are provided in order to limit the gate current peaks of the controlled rectifiers $SCR_5$, $SCR_6$ and to evenly divide gate current between these two silicon controlled rectifiers. A resistor $R_{12}$ is connected in circuit with the battery 52 to limit the holding current.

The operation of the control circuit 50 is initiated by connecting the input terminal leads 54, 55 across an alternating current supply and by connecting the signal input leads 61, 62 with a suitable pulse source 60. Let us now consider an arbitrary half cycle when the voltage induced across the secondary winding portion $S_1$ is of positive polarity at the upper end as seen in FIG. 4. During this half cycle the voltage at the anode controlled rectifier $SCR_5$ is positive with respect to the cathode and it is forward biased. If a positive pulse is applied to signal input terminals 61, 62 during this half cycle, tunnel diode $TD_4$ will be switched into its high impedance state and thereby diverts the holding current to the gates of the silicon controlled rectifiers $SCR_5$ and $SCR_6$. Since the controlled rectifier $SCR_5$ is forward biased, it will be triggered into a conducting state. It will be noted that during this arbitrary half cycle, the voltage at the anode of controlled rectifier $SCR_6$ is negative. Thus, controlled rectifier $SCR_6$ will not be fired in this half cycle.

During the interval that controlled rectifier $SCR_5$ is conducting the path of the current flow may be defined as follows: From the upper end of the secondary winding S, through controlled rectifier $SCR_5$, output lead 58, the load 51, output lead 56, tap 57 and back to the upper end of secondary winding S. During the alternate half cycle when the anode of controlled rectifier $SCR_6$ is positive with respect to cathode controlled rectifier $SCR_6$ will be fired by the holding current being diverted from $TD_4$ in its high impedance state.

It will be appreciated, that because of the latching action of control circuit 50, silicon controlled rectifiers $SCR_5$ and $SCR_6$ will continue to conduct on alternate half cycles until a negative voltage pulse appears across the signal input terminals 61, 62. The negative voltage pulse causes tunnel diode $TD_4$ to be reset to its low impedance state and the holding current supplied by the battery 32 is shunted through the tunnel diode $TD_4$ to the ground 59. In the next half cycle of the alternating current supply, neither controlled rectifier will be triggered, and direct current voltage will no longer be supplied to load 51. Thus it will be seen that the control circuit arrangement in accordance with the invention can be employed in a full wave center tapped rectifier supply to furnish latching relay control of D.C. power to the load 51.

From the foregoing description of the control circuits embodying the invention, it will be seen that I have provided improved control circuits which are characterized by simplicity, positive action and precise firing point. The control circuits are readily adaptable for use in connection with static types of relay circuits employing silicon controlled rectifiers. The relay circuits in accordance with the invention can be readily provided with a positive latching action and in another variation, a distinct advantage results in that the gate firing characteristics of a silicon controlled rectifier can be rendered substantially insensitive to junction temperature and anode voltage. In the control circuit arrangement of the invention I have provided a tunnel diode that not only serves as a sensing or reference element but also serves as a switching and latching mechanism. By connecting a tunnl diode with proper predetermined peak characteristics across the gate and cathode of a silicon controlled rectifier, it is possible to precisely fire the controlled rectifier when the peak current of the tunnel diode is exceeded.

It will be understood that the various applications of the control circuits described herein are intended as illustrative embodiments of the invention and that the invention is not limited to such embodiments thereof. It will be appreciated that the control circuit arrangement can be readily employed with controlled rectifiers connected for multiphase operation. It is to be understood, therefore, that I intend by the appended claims to cover all such modifications as fall within the true spirit and scope of the invention.

What I claim as new and desire to secure by Letters Patent of the United States is:

1. A control circuit for switching a source of alternating current through a load comprising at least one controlled rectifier having an anode, cathode and gate, means connecting said load in series with the anode-cathode path of said controlled rectifier, means connecting said serially connected load and controlled rectifier path to said source, at least one tunnel diode having an anode and cathode, said tunnel diode being operable between a low impedance and a high impedance state, circuit means connecting the anode of said tunnel diode in circuit with the gate of said controlled rectifier and connecting the cathode of said tunnel diode with said cathode of said controlled rectifier, and a current source connected across said tunnel diode, said tunnel diode having a peak current characteristic such that when the current supplied to the tunnel diode exceeds its peak current characteristic, said tunnel diode switches into a high impedance state and thereby diverts current to the gate of said controlled rectifier to fire said controlled rectifier each time the alternating current source voltage at the anode of said controlled rectifier is positive.

2. A control circuit for switching a source of alternating current through a load comprising at least one controlled rectifier having an anode, a cathode and a gate, means connecting said load in series with the anode-cathode path of said controlled rectifier, means connecting said serially connected load and controlled rectifier path to said source, at least one tunnel diode having an anode and a cathode, said tunnel diode being operable between a low impedance and a high impedance state, circuit means connecting said tunnel diode across the gate and cathode of said controlled rectifier, a current supply means to provide current connected with the gate of said controlled rectifier, said current supplied by said current supply means being less than the peak current of said tunnel diode but sufficient in magnitude to fire said controlled rectifier, and a pulse source connected across said tunnel diode, said pulse source providing a positive pulse to switch said tunnel diode into a high impedance state thereby diverting the current to the gate of said controlled rectifier in order to fire said controlled rectifier in response to the source voltage at the anode of said controlled rectifier exceeding a positive value, and providing a negative pulse having sufficient amplitude to reset the tunnel diode to a low impedance state thereby shunting said current through said tunnel diode in order to turn off said controlled rectifier in response to the current flow therethrough falling below a predetermined magnitude.

3. The control circuit set forth in claim 2 wherein a diode is connected in series circuit with said controlled rectifier to limit the reverse leakage current through said controlled rectifier resulting when a holding current is supplied to the gate of said controlled rectifier while it is subjected to an inverse voltage.

4. A control circuit comprising a pair of controlled rectifiers each having an anode, a cathode and a gate, a pair of input terminal leads adapted for connection in circuit with an alternating current supply, circuit means connecting said controlled rectifiers with said input terminal leads so that one of said controlled rectifiers when triggered permits current conduction during the positive half cycle of the alternating current supply and the other of said controlled rectifiers permits current conduction during the negative half of the cycle, at least one tunnel diode having an anode and a cathode, said tunnel diode being operable between a low impedance and a high impedance state, circuit means connecting said tunnel diode across the gate and cathode of at least one of said controlled rectifiers, a holding current means connected with said tunnel diode and supplying a holding current thereto, said holding current being less in magnitude than the peak current of said tunnel diode but sufficient to fire said controlled rectifier and sufficient to maintain the tunnel diode in its high impedance state once it has switched, a pulse source connected across said tunnel diode and supplying positive and negative voltage pulses, said positive voltage pulse being of sufficient amplitude to switch said tunnel diode to a high impedance state and thereby divert current to the gates of said controlled rectifiers in order to fire said controlled rectifiers each time the supply voltage at the anodes of said controlled rectifiers exceeds a positive value, and said negative voltage pulse being sufficient in magnitude to reset said tunnel diode to a low impedance state in order to turn off said controlled rectifiers in response to the current flow therethrough falling below a predetermined magnitude.

5. A control circuit comprising a pair of input terminal leads for connection in circuit with an alternating current supply, a pair of controlled rectifiers inversely conminal leads, each of said controlled rectifiers having an anode, a cathode and a gate, a first diode connected in inverse relationship across one of said controlled rectifiers, a second diode connected in inverse relationship across the other of said controlled rectifiers, at least one tunnel diode having an anode and a cathode, said tunnel diode being operable between a low impedance and a high impedance state, circuit means connecting said tunnel diode across at least one of said controlled rectifiers so that the cathode of the tunnel diode is connected with the cathode of said controlled rectifiers, said tunnel diode having a peak and valley characteristic such that when said peak current is exceeded the tunnel diode switches to a high impedance state and thereby diverts current to the gate of said controlled rectifiers, a potential source connected in circuit across the gate and cathode of said controlled rectifiers to supply a current sufficient in magnitude to fire the controlled rectifier having a positive anode voltage but less than the peak current of said tunnel diode when the alternating current supply voltage at the anodes of said controlled rectifiers exceeds a positive value and a pulse current supply means connected in circuit with said tunnel diode to provide a positive pulse thereto to cause said tunnel diode to switch to a high impedance state and a negative pulse to reset said tunnel diode to a low impedance state to turn off said controlled rectifiers when the current flow therethrough falls below a predetermined magnitude.

6. A control circuit comprising a pair of controlled rectifiers, each having an anode, a cathode and a gate, a pair of input terminal leads adapted for connection in circuit with an alternating power source, circuit means connecting said controlled rectifiers across said input terminal leads so that one of said controlled rectifiers when triggered permits current conduction during the positive half cycle of the alternating current supply and the other of said controlled rectifiers permits current conduction during the negative half of the cycle, at least one tunnel diode having an anode and a cathode, said tunnel diode being operable between a low impedance and a high impedance state, circuit means connecting said tunnel diode across the gate and cathode of at least one of said controlled rectifiers, a direct current potential source connected across the gate and cathode of said control rectifiers to provide a current sufficient in magnitude to fire the controlled rectifier having a positive anode voltage, said magnitude being less than the peak current of said tunnel diode, and a current source connected across said tunnel diode, said tunnel diode having a peak current characteristic such that when the current supplied to the tunnel diode exceeds its peak current characteristic, said tunnel diode switches into a high impedance state and thereby diverts current to said gate of said at least one of said controlled rectifiers to fire said controlled rectifiers each time the alternating current supply voltage at the anodes of said controlled rectifiers exceeds a predetermined positive value.

7. A control circuit comprising a pair of controlled rectifiers, each having an anode, a cathode, and a gate, a pair of input terminal leads for connection in circuit with an alternating power source, a circuit means connecting said controlled rectifiers with said input terminal leads so that one of said controlled rectifiers when triggered permits current conduction during the positive half cycle of the alternating current supply and the other of said controlled rectifiers permits current conduction during the negative half of the cycle, a tunnel diode having an anode and a cathode and being operable between a low and a high impedance state, circuit means connecting said tunnel diode across the gate and cathode of each of said controlled rectifiers, a current source connected across said tunnel diode, said tunnel diode having a peak current characteristic such that when the current supplied to the tunnel diode exceeds its peak current characteristic, said tunnel diode switches into a high impedance state and thereby diverts current to the gates of said controlled rectifiers to fire the controlled rectifier having a positive anode voltage.

8. A control circuit comprising a bridge rectifier having a pair of input terminals and a pair of output terminals, a pair of input terminal leads for connection in circuit with an alternating current supply, said input terminal leads being connected with the input terminals of said bridge rectifier, a controlled rectifier having an anode, a cathode and a gate, said controlled rectifier being connected across said output terminals of said bridge rectifier, a direct current potential source connected across the gate and cathode of said controlled rectifier, a tunnel diode connected across the gate and cathode of said controlled rectifier, said tunnel diode being operable between a low impedance and a high impedance state and having a peak current characteristic such that when said peak current is exceeded said tunnel diode switches to a high impedance state and thereby diverts current from said potential source to the gate of said controlled rectifier, said direct current potential source supplying a current sufficient in magnitude to fire said controlled rectifier being less than the peak current characteristic of said tunnel diode, and a current source connected across with said tunnel diode and providing positive and negative currents thereto, said positive current having sufficient amplitude to switch said tunnel diode to a high impedance state and fire said controlled rectifier each time the alternating current supply voltage at the anode of said controlled rectifier exceeds a positive value, and said negative current having sufficient amplitude to reset said tunnel diode to a low impedance state and turn off said controlled rectifier in response to the current flow therethrough falling below a predetermined magnitude.

9. A control circuit comprising a transformer having a primary winding adapted for connection across an alternating current supply and a secondary winding having a center tap, a first controlled rectifier connected with one end of said secondary winding, a second controlled rectifier connected with the other end of said secondary winding, each of said controlled rectifiers having an anode, a cathode and a gate, at least one tunnel diode, said tunnel diode being operable between a low impedance and a high impedance state and having a preselected peak current value, circuit means connecting said tunnel diode across the gate and cathode of said controlled rectifiers, a direct current potential source connected across the gate and cathode of said controlled rectifiers to supply a current sufficient in magnitude to fire the controlled rectifier having a positive anode voltage but less than the peak current of said tunnel diode, said tunnel diode having a peak current characteristic such that when said peak current is exceeded said tunnel diode switches to a high impedance state and thereby diverts current to the gates of said controlled rectifiers to fire the controlled rectifier having the positive anode voltage, a current pulse source connected with said tunnel diode, said current pulse source supplying a positive current having sufficient amplitude to switch said tunnel diode into its high impedance state and supplying a negative current having sufficient amplitude to reset said tunnel diode to a low impedance state, and a pair of output leads for connection to the load, one of said output leads being connected in circuit with said tap of said secondary winding and the other of said output leads being connected in circuit with the cathodes of said controlled rectifiers.

References Cited by the Examiner

UNITED STATES PATENTS

| 2,242,894 | 3/1941 | Lyle | 315—251 |
| 3,102,209 | 8/1963 | Pressman | 307—88.5 |

OTHER REFERENCES

"Applications and Circuit Design Notes," by Solid State Products Inc., Bulletin D420–2, August 1959, pages 5, 8, 14, 15, 27 and 28.

G. E. Tunnel Diode Manual, April 24, 1961, page 49.

I.R.E. Wescon Convention Record, Part 3 "Electron Devices," August 18–21, 1959.

Solid-State Thyratron Switches Kilowatts by Frenzel et al., reprint for Electronics, March 28, 1958, pages 52–55, page 54 relied on.

"The Tunnel Diode as a Pulse Generator," by Much, Electronic Industries, pages 106 and 107, February 1961.

"The Tunnel-Diode-Circuits and Applications," Electronics, November 27, 1959.

ARTHUR GAUSS, *Primary Examiner.*

JOHN W. HUCKERT, *Examiner.*

B. P. DAVIS, *Assistant Examiner.*